United States Patent [19]
Rippel

[11] Patent Number: 5,441,824
[45] Date of Patent: Aug. 15, 1995

[54] QUASI-BIPOLAR BATTERY REQUIRING NO CASING

[75] Inventor: Wally E. Rippel, Altadena, Calif.

[73] Assignee: Aerovironment, Inc., Monrovia, Calif.

[21] Appl. No.: 363,242

[22] Filed: Dec. 23, 1994

[51] Int. Cl.⁶ .................... H01M 6/48; H01M 10/18
[52] U.S. Cl. ...................... 429/53; 429/152; 429/185; 429/210; 429/245
[58] Field of Search .................. 429/53–55, 429/149, 152, 120, 174, 185, 186, 210, 245, 136, 139, 140

[56] References Cited

U.S. PATENT DOCUMENTS

| | | |
|---|---|---|
| 4,150,200 | 4/1979 | Sullivan ........................ 429/152 |
| 4,275,130 | 5/1981 | Rippel et al. . |
| 4,353,969 | 10/1982 | Rippel et al. . |
| 4,542,082 | 9/1985 | Rowlette . |
| 4,658,499 | 4/1987 | Rowlette . |
| 4,687,717 | 8/1987 | Kaun et al. . |
| 4,874,681 | 10/1989 | Rippel . |
| 4,888,256 | 12/1989 | Zuckerbrod . |
| 4,900,643 | 2/1990 | Eskra et al. . |
| 4,909,955 | 3/1990 | Morris et al. . |
| 4,939,050 | 7/1990 | Toyosawa et al. . |
| 4,945,019 | 7/1990 | Bowen et al. . |
| 4,964,878 | 10/1990 | Morris . |
| 4,988,581 | 1/1991 | Wycliffe . |
| 4,996,128 | 2/1991 | Aldecoa et al. . |
| 5,068,160 | 11/1991 | Clough et al. . |
| 5,114,807 | 5/1992 | Rowlette . |
| 5,162,172 | 11/1992 | Kaun . |
| 5,173,362 | 12/1992 | Tekkanat et al. . |
| 5,206,987 | 5/1993 | Mix . |
| 5,225,292 | 7/1993 | Korinek et al. . |
| 5,229,228 | 7/1993 | Doniat et al. . |
| 5,232,797 | 8/1993 | Moulton et al. . |
| 5,234,779 | 8/1993 | Mix et al. . |
| 5,254,415 | 10/1993 | Williams et al. . |
| 5,264,305 | 11/1993 | Charkey .................. 429/152 |
| 5,374,490 | 12/1994 | Aldecoa .................. 429/152 |

*Primary Examiner*—Anthony Skapars
*Attorney, Agent, or Firm*—Pretty, Schroeder, Brueggemann & Clark

[57] ABSTRACT

A quasi-bipolar battery is disclosed which has no casing, making it especially suitable for high-voltage, high-current applications where battery weight and cost are considerations. The quasi-bipolar battery is constructed of alternating bipolar plates and separator sheets, each of which has a frame of hard rubber which has been injection-molded thereon. This frame forms a gas-tight seal when these sheets and plates are stacked and compressed together to form the battery. Each biplate is formed with a tube of woven lead yarn which is slipped over a non-conductive biplate during the manufacturing process and prior to the injection-molding of the rubber frame. The injection-molded rubber frames bond beyond to the edges of the biplate and the lead yarn, and thereby prevent electrolyte leakage between cells by migration along the strands of lead yarn. When the battery cell stack is assembled and compressed axially, the compliant rubber frames interface with one another to form the seal and to permit lateral heat transfer. A thermal insulator at each axial and longitudinal end of the battery cell stack prevents axial heat transfer, thereby maintaining all the battery cells at a single, preferred operating temperature that provides maximum efficiency. Venting passages are also formed within the rubber frames to discharge gas buildup, which might occur under certain conditions.

13 Claims, 6 Drawing Sheets

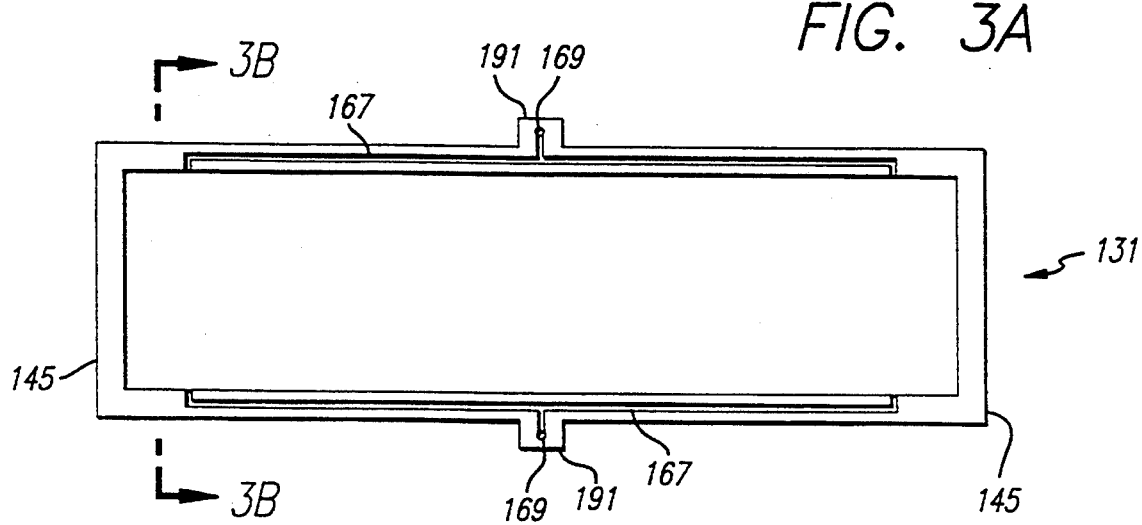
FIG. 3A
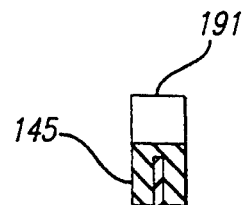
FIG. 3B
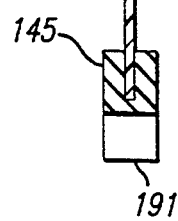

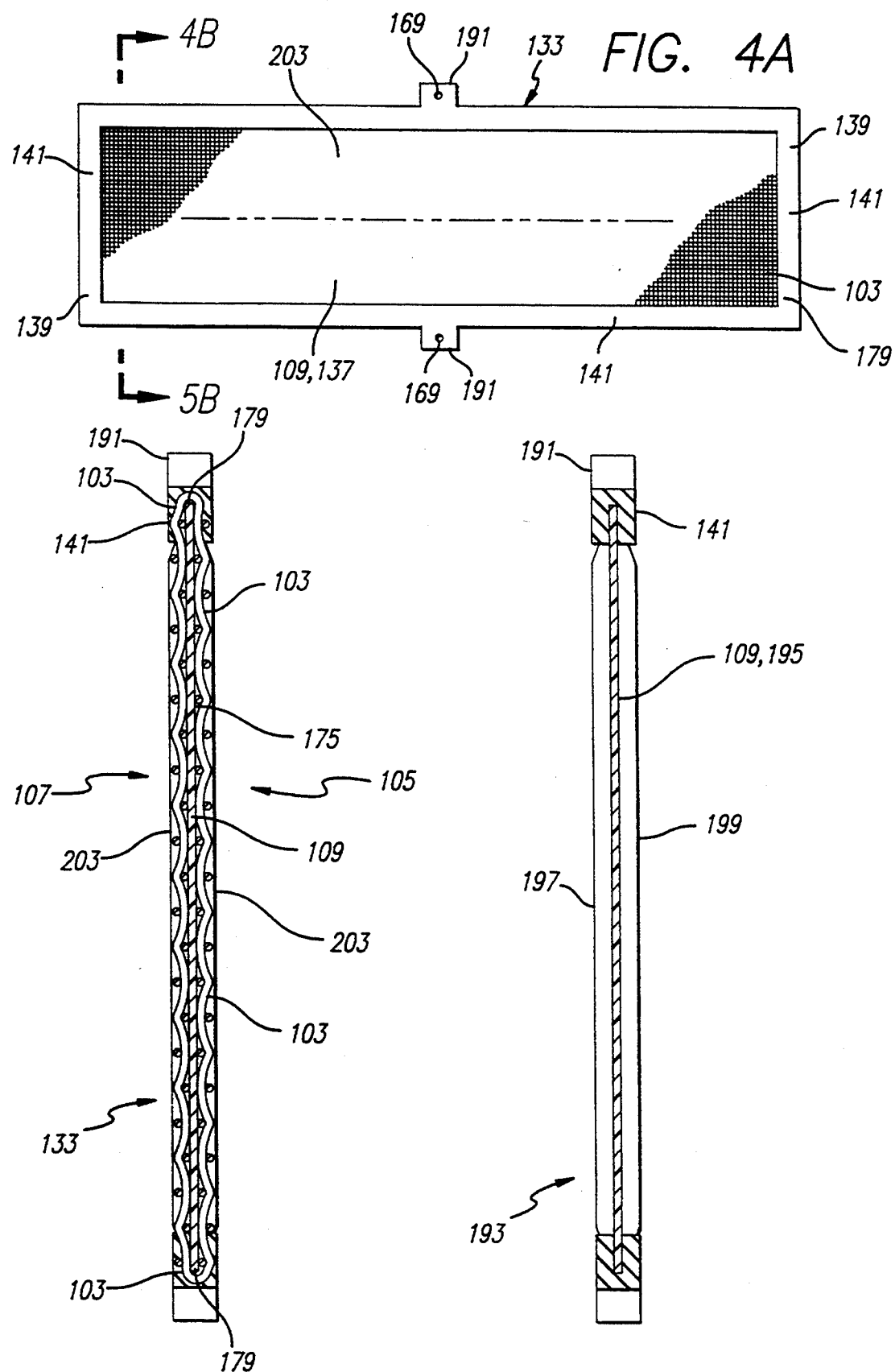

QUASI-BIPOLAR BATTERY REQUIRING NO CASING

The present invention relates to a battery, as well as a method for making that battery. More particularly, the invention provides a bipolar or quasi-bipolar chemical storage battery that provides electric power for high-power applications, such as an electric car.

BACKGROUND

I. Field of the Invention

As used herein, the term "battery" refers to an electrochemical storage device that may consist of one or more chemical power "cells" that each store electrical energy in the form of chemicals contained within the device. Typically, each cell includes three principal parts, including a positive electrode, a negative electrode and an electrolyte. The electrolyte is normally a liquid material, usually a relatively large molecule, that tends to dissociate or break-up into both positive and negative fragments. The positive electrode is composed of a material that naturally reacts with the positive fragment of the electrolyte, and requires free electrons for the reaction to proceed. On the other hand, the negative electrode is a material that naturally reacts with the negative fragment, and so, must rid itself of extra electrons as the chemical reaction proceeds. In this manner, each of the positive and negative electrodes have an electron surplus or deficiency which gives rise to a voltage, or difference in charge, between the two electrodes.

Batteries are typically made using one of several conventional battery structures, which are generally either "monopolar" or "bipolar." The most common batteries are monopolar batteries, for example, a conventional, 12-volt lead-acid car battery. These batteries have six 2-volt cells that each use lead (Pb) as the active material in one (i.e., the positive) electrode, lead-dioxide ($PbO_2$) as the other active material in the other electrode, and sulfuric acid ($H_2SO_4$) as the electrolyte. Typically, monopolar configurations are useful for low-voltage applications, or where other factors, such as high-longevity, are paramount, but they are generally not well suited for high-voltage applications. For these applications, other conventional battery structures such as bipolar configurations are generally better suited.

Distinguishing features of these various conventional battery structures will be discussed below.

II. Conventional Battery Structures

A. Monopolar Batteries

1. The Monopolar Prismatic Structure

The monopolar prismatic structure is the conventional structure which is generally used for most commercial battery applications. This structure consists of a multiplicity of cells packaged in a single case structure and electrically connected in series with one another. In turn, each cell is composed of a stack consisting of a repeating sequence of a negative plate, a separator, a positive plate and another separator (the stack usually ends with a negative plate, such that the number of negative plates exceeds the number of positive plates by one). Tabs extending from each of negative plates are interconnected by a conductive bus which forms a negative terminus for each of the cells. Likewise, tabs extending from the positive plates are interconnected by a conductive bus which forms a positive terminus for each of the cell.

Each negative plate can consist of a conductive "grid" onto which negative active material is applied. The grid serves both as a current collector and as a mechanical support for the active-material. Positive plates are similarly structured, except of course that positive active material is applied to the conductive grid. Both the negative and positive grids include integral projecting tabs, as discussed above. Conventional methods of grid fabrication include casting and expansion of thin sheet stock. The expanded metal approach is generally used for high-volume, thin-plate applications.

The monopolar prismatic structure is suitable for a wide variety of applications. Its advantages include ease of manufacture and low cost of manufacture. Its weaknesses include moderate Ohmic resistance associated with the grid and bus elements, and inability to accommodate extremely thin plate designs. It also suffers limitations in heat transfer, which become problematic for high-power applications. Each of these factors serve to limit the specific power capability of this structure. Another limitation of the structure is that active material is not as well "contained" as in other structures. This leads to reduced cycle life, especially in thin-plate, high-power applications.

2. The Monopolar Spiral-Wound Structure

The monopolar spiral-wound structure is similar to the prismatic version, except that only a single negative plate and a single positive plate (each having an expanded metal grid) are wound over a central core. A pair of conventional separators is used to separate the plates. Termination is typically achieved via grid tabs, which extend axially outward and are welded to respective current collectors.

Advantages of this structure include reduced parts count (only two plates and two separators are used per cell), amenability to extremely thin plates, good heat transfer, and improved active material containment. The principle disadvantages of the structure include reduced packaging efficiency due to the circular geometry, and the requirement that the battery cell be formed in-situ.

3. The Tubular Structure

The tubular structure features positive (and occasionally negative) plates, where active materials are contained within a multiplicity of woven tubes. Each of these tubes has a central conductive "spine" which electrically and mechanically connects with a common metallic current collector.

The chief advantage of this battery structure is long cycle life which is due to relatively effective containment of the active materials. Disadvantages include high manufacturing cost, low specific power and low specific energy. The low energy and low power performance is due to the large plate thicknesses, which is inherent in the design of tubular structures. Because of the excellent containment of the spiral-wrap structure, and with its high-performance and low-cost, this design appears to be displacing the tubular design in many applications.

B. Limitations of Monopolar Batteries

Typical monopolar cells are generally not suited for high-voltage, high-power applications, because series and parallel connections between monopolar cells are usually achieved by tapping connections at an end of each electrode; this increases the Ohmic resistance, heat transfer difficulties and weight of the battery, making monopolar designs less suitable for high-power applications. Additionally, the weight of separate enclosures for each cell of the monopolar battery, the liquid electrolyte and the inter-cell connections, all significantly increase the weight and material cost of the battery.

B. Bipolar Batteries

To address many of these difficulties, bipolar battery configurations were developed, which mount electrodes of adjoining cells on either side of a "biplate." The cells of the bipolar battery are thus simply layered in direct contact with one another, thereby providing large areas of interface and increasing charge mobility between cells. Since the bipolar cells contact each other directly, the required parts and the weight of the battery are both decreased. This tends to eliminate the need for current collectors corresponding to each electrode, and thereby tends to decrease battery weight, heat transfer problems and Ohmic resistance. Thus, bipolar configurations are better suited to high-voltage battery applications. Two different general types of bipolar structures are discussed below, namely, a "true bipolar" structure and a "quasi-bipolar" structure.

1. The True Bipolar Structure

The true bipolar structure has a "stack" that uses a sequence of elements, including a monopolar negative plate, a separator, a repeating sequence of bipolar plates and separators, and a monopolar positive plate. Electrical termination is achieved via the monopolar end plates. Each of the bipolar plates consists of a thin, electronically conducting sheet (called a biplate) having negative active material applied to one side of its flat surface and positive material applied to the other side.

Since the electronic path is extremely short between the positive and negative active materials of adjacent cells (i.e., due the small thickness dimension of the biplate), the electronic component of resistance is typically very small. In contrast, the ionic component of resistance is often higher than with monopolar designs, since ionic currents typically flow only toward one face of the biplate, i.e., toward a particular one of the active materials.

The advantage of the bipolar design is that low-resistance and high-power can be achieved for designs having plates of large lateral dimensions. Other advantages include inherently high-voltage production, good active material containment, the potential for eliminating "grid" materials, and potential ease of assembly.

The chief problems associate with the design of the true bipolar structure include corrosion stability of the biplate and difficulties in achieving a peripheral seal of the biplate. To date, these two problems have inhibited production of bipolar versions of the lead-acid system, despite moderate development efforts which have extended over two decades.

2. The Quasi-Bipolar Structure

"Quasi"-bipolar battery structures have been developed in an attempt to eliminate the corrosion problems which are present in the true bipolar design, and several quasi-bipolar battery designs currently exist. The common element for each is that a partitioned single grid or conductor structure has negative active material applied over one region and positive active material applied over a separate region. Designs for these batteries have addressed both high- and low- power applications. Newer designs for these batteries have also utilized a particular woven grid structure (described below) which has a glass core, making it highly resistant to corrosion.

In a high-voltage version of the quasi-bipolar battery, the "true bipolar" structure is simulated by the quasi-bipolar structure, in that a conductive material is wrapped around a non-conductive sheet. Individual bipolar plates formed by this process may thereafter be stacked to form a multi-cell structure. This approach side-steps some of the problems (i.e., high corrosion to the conductive biplate structure) associated with the biplate used in a true bipolar design, while it maintains most of the features of a true bipolar battery which are especially useful to high-power applications (e.g., high-voltage, low-electronic resistance, and use of stack assembly).

"Low-voltage" versions of the quasi-bipolar structure have also been under development. In one example, a grid element is divided into a left half and a right half. Negative material is applied to the left region, while positive material is applied to the right half region. Individual quasi-bipolar plates can then be stacked to achieve a multi-cell structure.

C. Woven Grid Structures.

With the exception of true bipolar designs, current collection is generally achieved via either cast grids or by expanded metal grids. Both of these designs suffer positive plate corrosion problems for lead acid applications. In the case of cast grids, corrosion is enhanced by a combination of large crystal dimensions and surface imperfections. With expanded metal grids, corrosion problems are enhanced by stress concentrations due to the grid formation process itself. In both cases, there exists a mechanism called "stress corrosion" wherein corrosion is enhanced by concentrations of mechanical stress and vice versa (i.e., mechanical stress and corrosion couple in a negatively synergistic manner).

A process has been recently developed and used in quasi-bipolar batteries, as indicated above, wherein lead (or an alloy of lead) is extruded over a fiberglass core to form a reinforced lead strand or yarn. Corrosion of this material is greatly reduced compared with both cast and expanded materials, for three primary reasons: First, the extrusion process itself establishes very small lead crystal domains, which inherently are corrosion resistant; Second, the surface of the extruded material is relatively smooth and without significant imperfections; Third, the fiberglass core is strong and provides good mechanical strength, and thereby de-coupling the otherwise cooperating mechanisms of stress and corrosion.

Because of the high corrosion resistance of this coaxial, conductive material, thin, light-weight grid structures may be fabricated which simultaneously achieve long life, high specific energy and high specific power. This is achieved by weaving the lead yarn material to form a "scrim" type of material which can then be pasted with active materials. However, because of the difficulty of electrically terminating such scrims, conventional monopolar designs using woven grids are generally not practical. On the other hand, plates based on woven grids may be applied with moderate ease to quasi-bipolar designs, since there is no requirement for current collection at a single point, except at the end monopolar plates.

While substantially reducing corrosion, quasi-bipolar designs which make use of this type of woven grid structure still are generally susceptible to leakage and corrosion at the edges of the individual battery cells. Further, as with the true bipolar and other batteries, these woven grid batteries still suffer heat transfer and cooling problems, as well as fabrication difficulties. These problems are further discussed below.

III. Battery Environment

For typical large scale applications, such as electrically powered vehicles, cells are packaged into modular housings, which in turn, are packaged into a "pack structure." Both the cost and mass for the sum of these packaging elements represents a significant fraction of the total.

Further added to this problem is the fact that battery cell performance is dependent upon temperature, which can differ between the individual cells within the battery stack. With a casing external to the battery cells, it becomes very difficult either to cool the battery to keep it at a preferred operating temperature, where it exhibits maximum efficiency, or to maintain a uniform operating temperature amongst the various individual cells of the battery. As with many chemical reactions, the battery cells operate most efficiently at a particular temperature, and deviation from this temperature by any of the cells results in less efficiency, and may also result in reduced performance and/or reduced life. Battery cells are heated and cooled as they are charged and discharged and, consequently, cells at the middle of the stack may be experience a different temperature than cells at the ends. Further, improper temperature, or improper charging, can also cause the electrolyte and active materials to form gasses, which detracts from battery operation by removing needed materials from the chemical process, interfering with charge carrier migration, and by generating excess pressure. This problem may also require venting of the gasses from the cells.

To address this venting problem, individual cells are sometimes designed to have a pressure relief valve, which discharges gas pressure exceeding a predetermined amount. However, this adds components to each individual cell and significantly increases parts cost and assembly cost.

Construction of batteries can be fairly intricate, and expense is directly related to the number of parts involved and the time required to assemble them. For example, where a casing is used external to the battery stack, to provide for containment of the electrolyte and active materials, the leak-proof status of the casing must be independently tested and assured. In addition, electrical connections are required to the end plates of the stacks so that current may be collected and supplied to the battery terminals. Typically, these connections require the manufacture of an appropriate current collector, which lies at either end of the battery stack and electrically couples output terminals of the battery to the finished stack. In the case of quasi-bipolar batteries, it is also typically necessary to independently place folded conductive lead yarn material about opposite sides of the substrate while layering them, and further, independently heat-seal each cell's biplate to adjacent separator plates. These complicated operations all contribute to added expense, and do not completely solve the problem of permitting uniform heat transfer.

Accordingly, there exists a definite need for a battery configuration that uses a minimal number of parts, is preferably inexpensive, and that is relatively easy to manufacture and assemble. Such a battery would contribute beneficially to reducing the costs of battery manufacture, and further, would be a positive step to producing affordable high-power electric batteries, such as could be applied to highway-speed electric vehicles. In addition, there exists a need for a lightweight battery that is relatively small in size, provides for improved cooling, and thereby produces power with heightened efficiency. The present invention satisfies these needs and provides further, related advantages.

SUMMARY OF THE INVENTION

The present invention provides a bipolar battery that is well-suited to high-power applications. More particularly, the present invention provides a bipolar battery that uses fewer parts and is more easily assembled, thus providing a less expensive battery. It also facilitates lateral heat transfer, permitting all battery cells to be laterally and uniformly cooled, and thereby operate at the same temperature. Thus, this battery can have great utility in high-voltage applications, such as in the propulsion of electric cars.

In accordance with one form of the invention, a method is provided for making an electric battery having a plurality of cells that themselves each contribute to battery structural support. Each of these cells has parts that provide for gas and active material containment such that, following stacking of the plurality of cells along a battery axis, the stack is self-contained, and no casing external to the individual cells is necessary to prevent the leaking of gas, active material or electrolyte to the outside of the battery structure. According to this method, cells are produced by layering the biplate with a compliant sealing material on both sides, to frame middle portions of each side which receive the active materials. Separator sheets lie between each biplate to differentiate the cells when the battery stack is assembled. During assembly, a gas-tight seal is created between each of the plates by the compliant sealing material. Thus, a self-contained battery stack is created which does not require an external casing, thereby providing for a lighter and less expensive battery.

The present invention also provides for a battery that is preferably created by the method just described. In more particular forms of the invention, this battery may be a quasi-bipolar battery where each bipolar plate is constructed using a tube of conductive fabric that slides over a substrate utilized as the biplate. Use of this tube provides for easier battery construction, and allows for lateral heat transfer across each cell to the compliant sealing material, which acts in the stead of a casing. The compliant sealing material can transmit heat through the lateral sides of the battery, thereby allowing cooling of each cell by the battery exterior. In addition, however, the preferred battery can also include thermal insulators at either end which block axial heat transfer through the end cells of the battery stack, thereby preventing the bipolar cells from operating at mutually different temperatures. Using this construction, all cells operate as close to the same temperature as possible, and are cooled through the lateral sides of the battery, as facilitated by the tube of conductive fabric that is used when the preferred quasi-bipolar battery is the subject implementation.

Finally, in yet other forms of the invention, a battery and method of making a battery are provided which focus upon the use of the tube of conductive material as a mechanism for fostering lateral heat transfer.

The invention may be better understood by referring to the following detailed description, which should be read in conjunction with the accompanying drawings. The detailed description of a particular preferred embodiment, set out below to enable one to build and use one particular implementation of the invention, is not intended to limit the enumerated claims, but to serve as a particular example thereof.

BRIEF DESCRIPTION OF THE DRAWINGS

FIG. 3A is a top view of a separator plate used in each battery cell. FIG. 3A shows the rubber frame of the separator sheet having a groove at either longitudinal side of the sheet, for permitting the venting of gases that may develop.

FIG. 3B is a cross-sectional end view of the separator sheet of FIG. 3A, taken along lines 3B—3B of FIG. 3A.

FIG. 4A is a top view of a quasi-bipolar plate; it illustrates a biplate with a tube of woven lead yarn wrapped about it and sealed to it on each side by a compliant sealing material that frames a middle region of each side of the biplate. The sealing material provides a venting passage at each transverse end of the biplate.

FIG. 4B is an end view of the bipolar plate seen in FIG. 4A, taken along lines 4B—4B of FIG. 4A.

FIG. 4C is a cross-sectional end view of a bipolar plate used to construct an alternative embodiment, namely, a true bipolar battery; unlike the biplate of FIG. 4B, the biplate seen in FIG. 4C is electrically conductive and ionically insulative, and has electrode layers attached to it on either side.

DETAILED DESCRIPTION

The invention Summarized above and defined by the enumerated claims may be better understood by referring to the following detailed description, which should be read in conjunction with the accompanying drawings. This detailed description of a particular preferred embodiment, set out below to enable one to build and use one particular implementation of the invention, is not intended to limit the enumerated claims, but to serve as a particular example thereof. The particular example set out below is the preferred specific implementation of a battery, a quasi-bipolar battery in particular, that will be preferably used for powering an electric vehicle at highway speeds for long duration.

I. Introduction to the Principal Parts

The preferred implementation of the present invention is as a quasi-bipolar battery 101 that will preferably be used to power an electric car. The following disclosure deals, in general, with a high-voltage structure composed of bipolar plates which may be "true bipolar" plates or "quasi-bipolar" plates. In the preferred embodiment, where the bipolar plates are "quasi-bipolar," woven lead yarn material 103 is used to support the active materials 105 and 107, whereas the active materials may be embedded upon the biplate 109 (e.g., an electrically conductive biplate itself) if a true bipolar battery is desired.

Figure 1A:
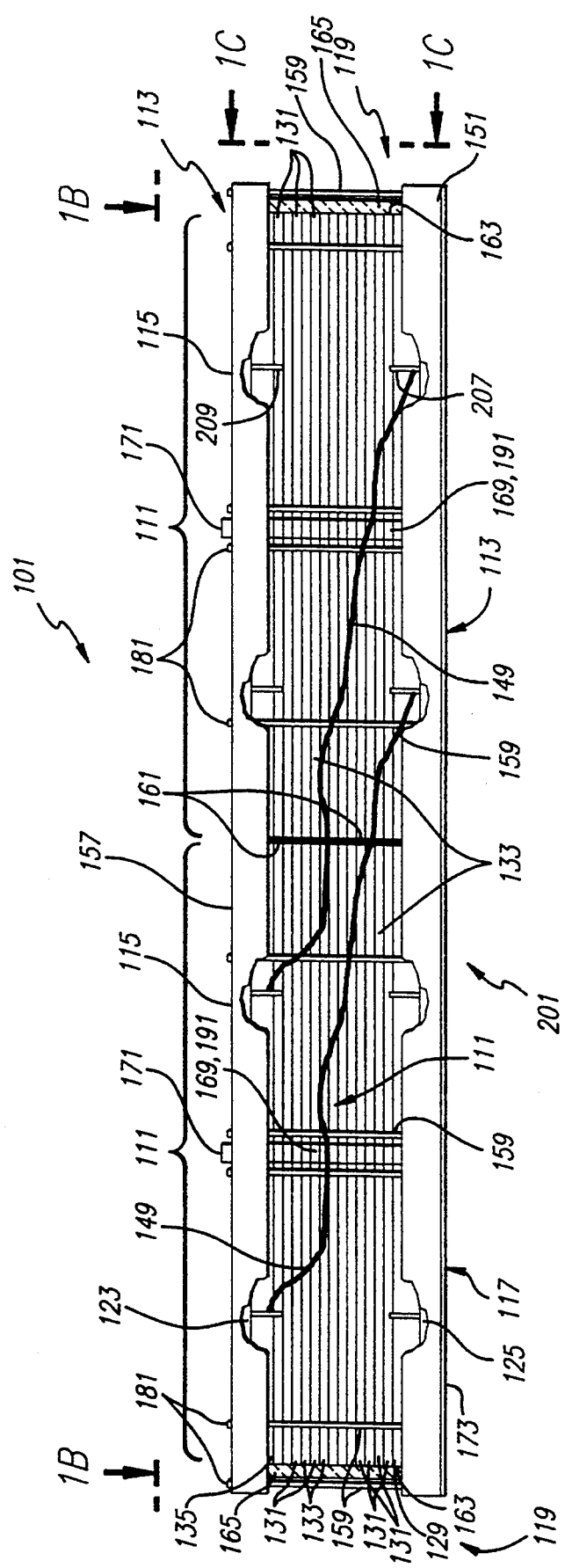
FIG. 1A is a side view of a quasi-bipolar battery that is the preferred implementation of the present invention. The battery includes two battery cell stacks which are shown lying adjacent to one another. Each stack has eighty-five cells with a thermal insulator (hidden from view in FIG. 1A) and bulkhead and battery tray at each of top and bottom ends of the battery, respectively.
Figure 1B:
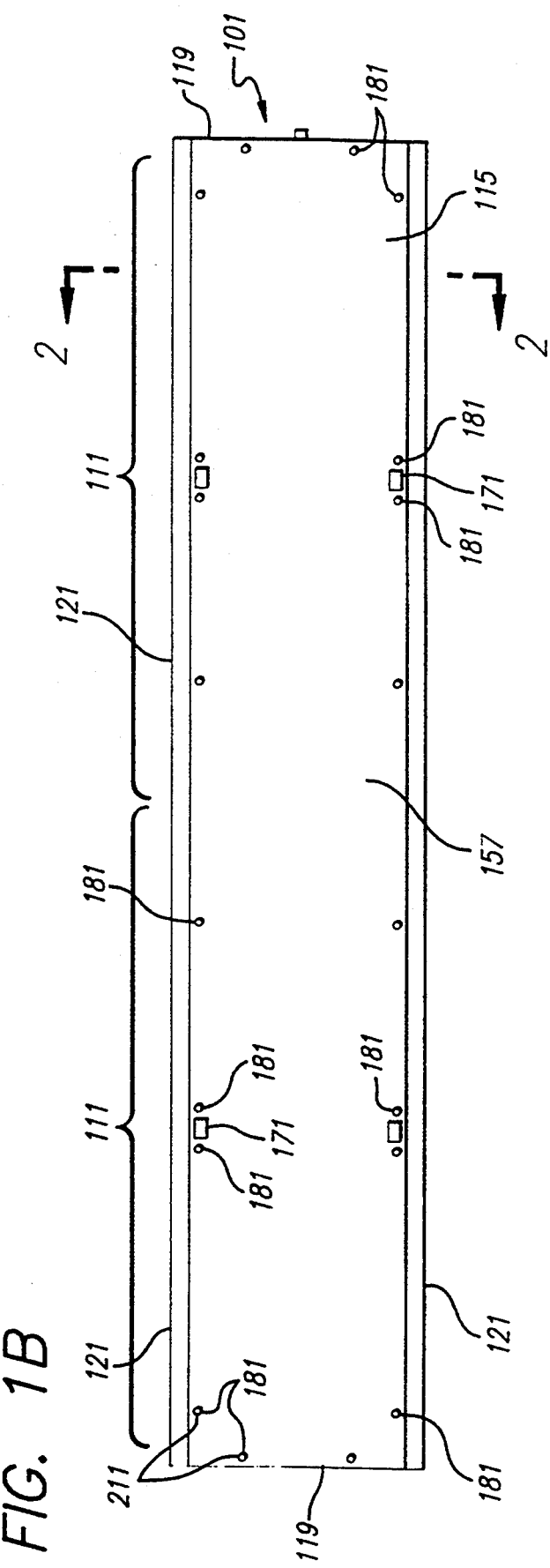
FIG. 1B shows a top view of the battery of FIG. 1A, taken along lines 1B—1B of FIG. 1A.
Figure 1C:
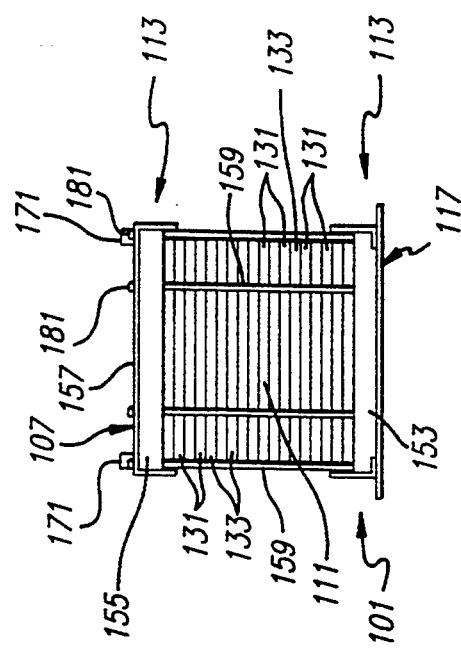
FIG. 1C shows an end view of the battery of FIG. 1A, taken along lines 1C—1C of FIG. 1A. The thermal insulators which were hidden from view in FIG. 1A are seen sandwiched between the battery cell stack and the bulkhead and battery tray.

As seen in FIGS. 1A-1C, the battery 101 is generally rectangular in shape, and is about six feet in length by one foot in each of width and height. The preferred battery 101 is especially suited to the environment of an electric car, since it does not feature an external casing, thereby reducing battery weight and cost, and facilitating battery cooling. The battery 101 includes two yard-long cell stacks 111, laid end-to-end along the longitudinal direction of the car, and a single bulkhead structure 113 that compresses both of the cells stacks. Cell stacks 111 are thermally insulated at the top 115, bottom 117, and longitudinal ends 119 of the battery to prevent heat transfer with the environment outside the battery at those ends. On the other hand, the battery has no thermal insulation on its lateral sides 121, thereby permitting air as it flows within a battery compartment of the car to cool the battery along its sides. The battery cell stacks 111 are adapted to permit the venting of excess gasses produced by the battery, and have current collecting layers 123 and 125 at either end that electrically terminate the battery and help provide a battery output at a set of terminals 127.

The cell stacks 111, as seen in FIG. 1A, include a number of vertical elements which are stacked on top of one another and compressed together by the bulkhead structure 113. Each cell stack 111 has a vertical sequence of elements, including: a bottom current collecting sheet 125; a bottom monopolar plate 129; an alternating and repeating sequence of separators 131 and bipolar plates 133; a top monopolar plate 135; and a top current collecting sheet 123. Referring to FIG. 4A, each bipolar plate 133 consists of a central, electronically non-conductive biplate 137, which is framed with compliant sealing material 139 to form a biplate sealing frame 141. Within this framed structure, the biplate 137 is covered on its two flat sides with the two active materials, a positive active material 105 on one side, and the negative active material 107 on the other. Likewise, each separator 131 is also framed with compliant sealing material 143 to form separator sealing frame 145. The two current collecting sheets 123 and 125 of each cell stack each include projecting tabs 147 which interconnect with terminals 207 and 209. Cell stacks 111 have their terminals 207 and 209 connected in series via cables 149.

As is seen in FIGS. 1A and 1C, each of the two cell stacks 111 are commonly supported between a lower support consisting of the bulkhead structure, namely, a battery tray 151 and a thermal insulating sheet 153.

Against this lower support structure, an upper support structure consisting of a second thermal insulating sheet 155 and a bulkhead 157 is tensioned downward, toward the battery tray 151 to compress the individual layers 131 and 133 together and form a gas tight seal with the repeating pattern of sealing frames 141 and 145. The battery tray 151 and the bulkhead 157 are drawn together by the action of number of tie-rods 159, such that compressive forces are applied to each of the cell stacks 111. The cell stacks 103 lie end-to-end, and thus, each cell stack has a longitudinal end 161 that abuts the adjacent cell stack and an end 163 that does not. Two end thermal insulating sheets 165 are placed, one each, at the non-abutting ends 163 of each three-foot long cell stack 111. The thermal insulating sheets 153, 155 and 165 serve to restrict transfer of heat produced within the cell stack to the lateral dimension only, making the preferred battery described ideally suited for the environment of an electric car, where air can be allowed to flow along the lateral sides 121 of the six-foot long battery. This ensures uniformity of temperature between each of the cells within the cell stack.

If conditions of over-charge occur, oxygen can be produced by the positive active material 105 at a rate faster than the rate of recombination at the negative active material 107. To accommodate this condition, gas manifolding and valves are provided for, as illustrated in FIG. 3A. Specifically, grooves 167 are molded into one or both sides of separator sealing frames 145, to thereby communicate with venting passage 169 located in both the separator and bipolar plate frames 141 and 145, as well as with the bulkhead 157. Each of the venting passages 169 mutually align during assembly of the cell stacks 111 to establish vertical channels for transport of gases which permit their flow toward the bulkhead 157. At the bulkhead 157, pressure relief valves 171 terminate the passages and permit venting of gasses from inside the battery 101 only if excessive pressures develop.

These principal parts and their assembly together to form the preferred bipolar battery 101 will be described below.

II. The Individual Quasi-Bipolar Plates

A. The Layers That Make Up The Bipolar Plates

The bipolar plates 133 may, as further described below, be a true bipolar plate, where side-to-side electronic conductivity is a property of the biplate material itself. Unfortunately, to date no material has been identified which provides the needed electronic conductivity, while simultaneously achieving freedom from electrochemical corrosion and meeting the interface requirements for both positive and negative active materials. Because of this situation, the presently favored means of achieving side to side conductivity is via a quasi-bipolar construction as described below.

For the preferred bipolar plate design, each bipolar plate 133 consists of a non-conductive biplate 109 (which serves as a substrate sheet) around which is wrapped a continuous sheet of woven lead yarn 103. The woven lead yarn 103 serves to provide both mechanical support for the active materials 105 and 107, and also current collection for both negative active material 107 placed on one side of the biplate 109 and positive active material 105 placed on the reverse face of the biplate. The woven lead yarn 103 also serves to aid in the conduction of heat produced in the region of the active materials to the peripheral regions of the bipolar plate 133.

Also forming a part of the repeating pattern of layers of the cell stacks 111 is a separator sheet 131, which separates each two adjacent bipolar plates 133. These separator sheets 131 are ionically-conductive and electronically-insulative porous glass mats about one millimeter in thickness, and permit ionic charge transfer between adjacent bipolar plates 133. This transfer is provided by a small amount of electrolyte 175 that is added to the active materials 105 and 107 as the stacks 111 are assembled.

Figure 2:
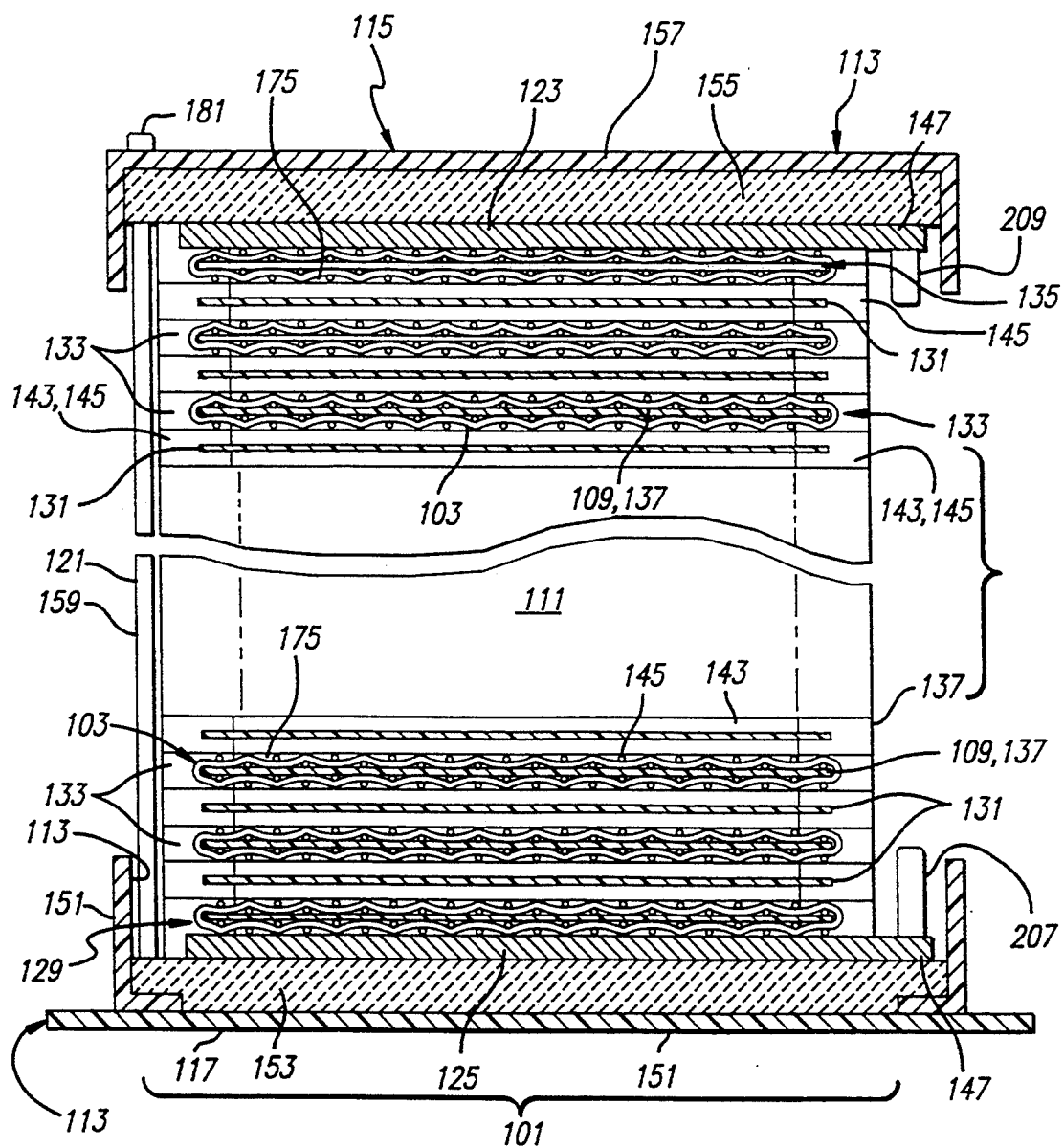
FIG. 2 is an illustrative view of the battery of FIG. 1C, and illustrates in expanded detail the composition of the battery cells that form the stacks.

The preferred battery 101 is a lead-acid battery, and so, each of its bipolar plates 133 have lead (Pb) and lead-dioxide ($PbO_2$) as their active materials 105 and 107, dilute sulfuric acid ($H_2SO_4$) as an electrolyte 175, and produce a two-volt potential difference. With reference to FIG. 2, the woven lead yarn 103 comprises a tube 177 of lead yarn which is wrapped completely about the biplate 109 to facilitate lateral heat transfer and provide conduction of electrons between the two active materials 105 and 107. The positive active material 105 on one side of the biplate 109 is lead-dioxide, while the negative active material 107 on the other side of the biplate is lead paste. The biplate 109 as mentioned, is formed of high density polypropylene, which provides the advantages in cost and electrochemical stability in the lead-acid environment. The biplates 109 are made to have a thickness of 0.0127 centimeters, a length of thirty-five inches and a width of nine inches. Thus, the acid electrolyte 175 cannot pass through the biplates 109, and the only mechanism of conducting charge from one side of the biplate to the other is by electrical conduction of electrons through the lead yarn around the edges 179 of the bipolar plates 133. This is what is meant when it is said that the present battery 101 is of "quasi-bipolar" construction. On the other hand, since the glass separator sheets 131 are porous, they permit positive ions to pass therethrough to serve as a charge carrier between adjacent bipolar plates 133. However, the separator sheets 131 are not themselves conductive and thus keep the active materials 105 and 107 of adjacent bipolar plates 109 out of direct electrical contact.

One feature of the preferred battery 101 is the use of frames 141 and 145 of compliant sealing material, which permits the bipolar plates 133 to be assembled and compressed such that no casing is necessary. Rather, the compliant sealing materials 139 and 143 form a gas-tight seal upon compression of the battery cell stacks 111, and also itself forms the battery's protective casing.

Each of the bipolar plates 109 and the separator sheets 131 is preferably made to have their compliant sealing material 139 or 141 formed into a frame shape on either side of each of those sheets. The compliant sealing materials 139 and 141 are preferably both injection-molded hard rubber, and provides a sufficient atomic bond with the woven lead yarn 103 to prevent electrolyte 175 penetration along the surface of the woven lead yarn and across a biplate 109. As an alternative, the frames 141 and 145 can also be made of injection-molded polypropylene. After stacking of the repeating pattern of these layers (to form 80 bipolar cells) and the thermal insulators 153, 155 and the bulkhead structure 113 are in place, each battery cell stack 111 is compressed by tightening tie-rod nuts 181 to tension the tie-rods 159. A gas-tight seal is also formed between the sealing frames 141 and 145 that retains the positive or negative active materials (105 or 107) and the sulfuric acid electrolyte 175 between each separator sheet/bipolar plate interface. The bipolar plate assembly, including its frames 141 of compliant sealing material 139, is only 0.21 centimeters thick.

B. Cell Fabrication

The preferred battery 101 preferably uses a small number of parts and a relatively simple manufacturing process. Several tasks exist in the cell manufacturing process for each of the separator sheets 131 and the bipolar plates 133.

With respect to each bipolar plate 133, a tube 177 of woven lead yarn 103 is first wrapped around and adhered to the biplate 109. Second, the biplate compliant sealing material 139 is deposited as a frame 141 at the lateral edges of the biplate, to engage each adjacent separator sheet 131 during stacking. Third, active materials 105 and 107 are applied to their respective sides of the biplate, and a curing process is performed to complete assembly of the bipolar plates 133 and ready them for stacking. Fourth, an automatic brushing process is employed to ensure that all portions of the bipolar plate sealing frame 141 are free from foreign materials, to ensure a good seal.

The separator sheets 131 do not have conductive material wrapped about them, as they are porous to provide for electrolyte 175 absorption and ionic transport between bipolar plates 133. The dimensions of the separator sheets 131 which, as mentioned, are porous glass mats, are thirty-five inches, by nine inches, by approximately one millimeter in thickness. A frame 145 of the compliant sealing material 143 is injection-molded about the lateral edges of the separator sheets 131, on both sides, just as was done in the case of bipolar plate construction. In this manner, upon compression of the cell stacks 111, the frames 141 and 145 of each bipolar plate 133 and separator sheet 131 interface will form a better seal than would be the case if the frames were required to directly interface with the opposing sheet 131 or plate 133. The compliant sealing material 143 utilized for the separator sheets 131 is preferably the same material that was used for the biplates 109, namely, hard rubber, but it does not necessarily have to be the same material. Also, unlike the bipolar plate sealing frames 141, the separator sheet frames 145 are not relied upon to seal the woven lead yarn 103 against electrolyte 175 creeping, and thus the separator sheet sealing frames 145 do not need to be as thick as the bipolar plate sealing frames 141.

Since it is desired to make the sheets and plates as thin as possible, it is necessary to handle the thin separator sheens 131 and biplates 109 at all times without inflicting any damage to them. The preferred approach for this handling includes the use of a vacuum pick-up device, where suction forces are evenly applied over the surface of the entire plate 109 or sheet 131. This approach is also well-suited for robotics-stack assembly of the alternating separator sheet 131 and bipolar plate 133 combination.

Figure 5A:
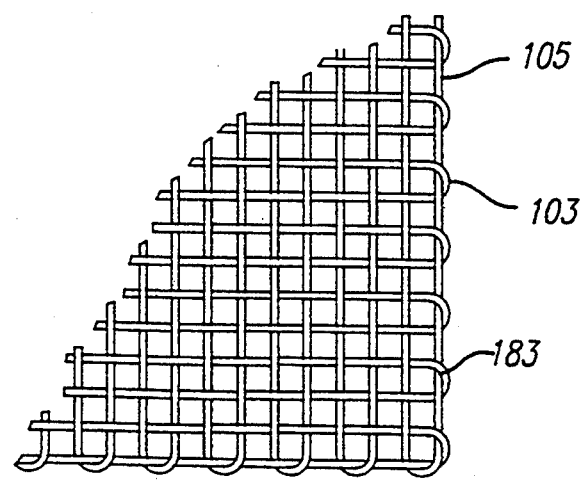
FIG. 5A is an illustrative diagram showing the weave of the lead yarn that is wrapped around the bipolar plate during assembly. The weave includes two layer strands of lead yarn, with an inner layer of glass fibers and a concentric outer layer of lead.
Figure 6:
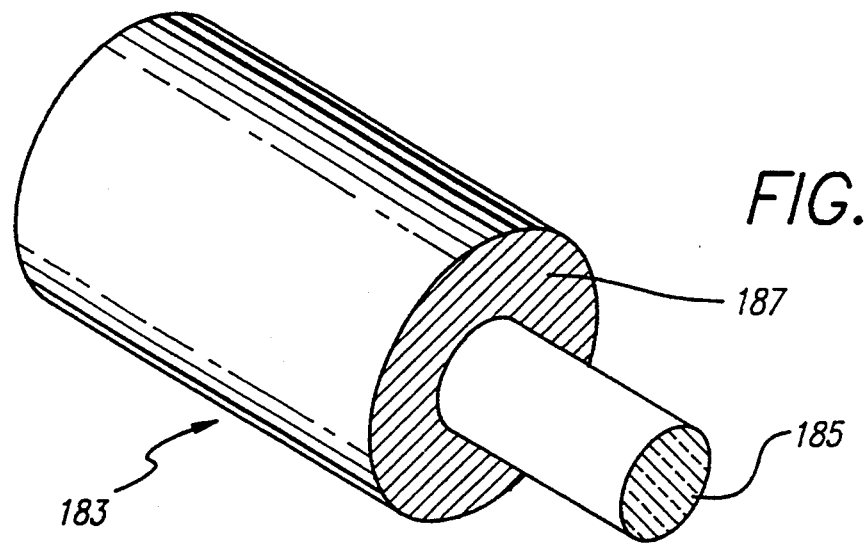
FIG. 6 is an illustrative diagram of a single strand of lead yarn, showing an inner layer of glass fibers and a concentric outer layer of lead.

In processing the biplates 109 to manufacture the individual bipolar plates 133, it is first desired to wrap the biplate with the woven lead yarn 103. FIG. 5A shows a weave of the lead yarn 103 where each strand 183 represents conductive lead that can transport electrons and support one of the positive and negative active materials 105 and 107. As seen in FIG. 6, the woven lead yarn 103 is a two layer material having an inner layer of glass fibers 185, and an outer layer of lead 187.

Figure 5B:
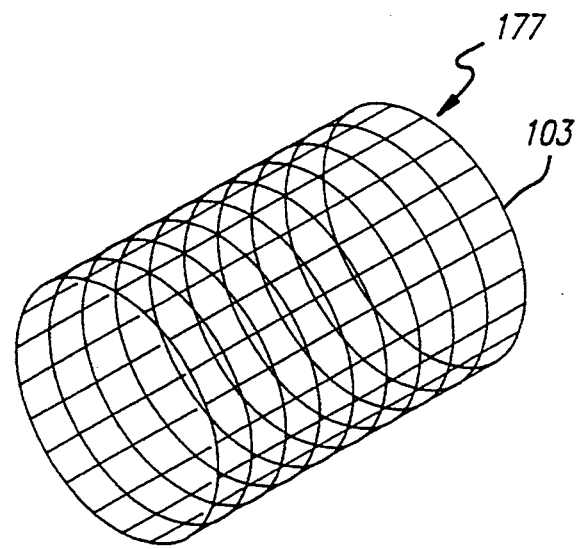
FIG. 5B is an illustrative diagram of the lead yarn of FIG. 6A, woven into a tube, which receives the biplate within the tube during manufacture of a quasi-bipolar cell.

The woven lead yarn 103 is woven together to form a tube 177 of material (FIG. 5B) into which the biplate 109 will be inserted during manufacture of each one of the bipolar plates 133. Importantly, the circumference and length of the tube 177 is made to correspond to the dimensions of the biplates 109, such that each tube 177 barely fits around its corresponding biplate 109, as is seen in FIGS. 4A and 4B.

During the first, aforementioned step, the tube 177 of woven lead yarn 103 is adhered to the biplate 109 using a commercially available adhesive. Selection of an appropriate adhesive is left to one of ordinary skill in the art, and it is noted that several adhesives are currently used in the construction of conventional sealed lead-acid batteries that should be more that adequate for construction of the preferred quasi-bipolar battery 101. However, it is contemplated that the adhesive will be applied to the biplate 109 prior to its insertion into the tube 177 of lead yarn 103. As an alternative, the lead yarn 103 may be woven into sheets and wrapped completely around the biplate 109 using an automatic wrapping procedure. Due to the thin nature of the biplates 109 (approximately 0.004"), it is preferred that the wrapping procedure be performed using the tube 177, since this requires minimal handling of the thin biplate during manufacture, and the tube can simply be pulled over the biplate. This promotes a simpler and less expensive manufacturing procedure.

Following this wrapping process, the biplate compliant sealing material 139 is injection-molded about the biplate 109, as can be best seen in FIGS. 4A and 4B. The material 139 is molded into a frame 141 on both sides of the biplate to securely bond with the woven lead yarn 103 to prevent creeping of the electrolyte 175 around the edges of the biplate. This sealed relationship may be seen in FIG. 1A at the longitudinal end 119 of the battery 101, where it is observed that the bipolar plate sealing frame 141 forms an appropriate, smooth surface that engages the separator sheet sealing frames 145.

The frames 145 for the separator sheets 131 and bipolar plates 133 are formed to have along each of their longitudinal edges 189 a protruding tab 191 that assists the venting of gasses through the grooves 167 in the separator sheets 131. To achieve this, following injection-molding, venting passages 169 are molded into a central portion of the tabs 191, to thereby enable alignment of the venting passages through all of the plates 109 and sheets 131 in the cell stack 111. The diameter of these passages 169 is approximately 0.10".

It is expected that during the compression of the cell stacks 111, to be described below, some of the biplate compliant sealing material 139 may dislodge at limited areas where the woven lead yarn 103 enters the bipolar plate sealing frame 141. The presently contemplated approach to this problem, should it develop in practice, will be to provide a thin inner frame of a second compliant sealing material that will provide a relatively more compliant buffer at locations where the woven lead yarn 103 enters the biplate sealing frames 141.

Before the bipolar plates 133 and separator sheets 131 are assembled together to form the battery cell stacks 111, it is necessary to spread the active materials 105 and 107 on the face of the woven lead yarn 103, and thereafter cure the biplates. Conventional methods of stacking the pasted bipolar plates 133 and placing them within a chamber having a controlled known temperature and humidity presently appear to be well-suited and preferred for the curing process.

III. Use of True Bipolar Cells

The principles of the present invention also apply to a battery that is constructed to be "true bipolar" instead of the preferred quasi-bipolar battery 101 that is the preferred embodiment. To achieve this, it is simply necessary to construct individual true bipolar plates 193 which have a conductive biplate 195 as their substrate. Each of these plates have a positive active material 197 and a negative active material 199 applied to opposite sides of that substrate. It is also necessary to injection-mold a rubber sealing frame 201 about this "true bipolar" plate 195, preferentially prior to the deposition of any electrode materials 197 and 199 on the biplate surface. A suitable brushing technique as has been previously described is then used to remove foreign materials from the surface of the true bipolar plate sealing frame 201 just prior to the stacking assembly, such that the frame can establish a gas-type seal once the electrolyte is added and the battery cell stack assembled.

IV. Assembly Of The Battery Cell Stacks 111

A. Stacking The Elements Together

Once the curing process has been, completed, electrolyte 175, in the form of dilute sulfuric acid, is added to the separator sheets 131 and bipolar plates 133. Because of the large plate dimensions, this electrolyte 175 must be added uniformly over their entire surfaces, excluding the portions of them that support compliant sealing material 139 or 141. The distribution of this electrolyte 175 is assisted during compression of the battery cell stacks 111; however, it is preferable to avoid electrolyte 175 contact with the negative active material 107 prior to assembly, as oxidation of the lead paste will occur. Accordingly, it is desired to have electrolyte 175 added to the separator sheets 131 and to the positive active material side of the bipolar plate 133 immediately prior to the robotic assembly and compression of the battery cell stacks 111.

The stacking of the cells is first commenced by layering the battery tray 151 with the bottom thermal insulator 153, followed by a bottom current collecting sheet 125 and a monopolar bottom plate 129. Both this plate and a monopolar top plate 135 are similar in construction to the bipolar plates 133, discussed above, except that they have active materials spread on only one side of them which faces the repeating pattern of separator sheets and bipolar plates 131 and 133. The woven lead yarn 103 is electrically "sandwiched" against the appropriate current collecting sheet 123 or 125 and establishes electrical contact between the battery cell stack 111 and one of the terminals 207 or 209.

The bottom monopolar plate begins the repeating pattern of layers of separator sheet 131 and bipolar plate 133 (with active materials 105 and 107 contained within a middle region 203 of each sheet 131 and plate 133). Accordingly, following the placement of the monopolar bottom plate 129 and the current collecting sheet 125, separator sheets 131 and bipolar plates 133 are alternately placed on top of one another until approximately eighty-five bipolar plates have been laid (to form a 170-volt battery stack). During this process, each side of each plate within their corresponding frames 141 or 145 are brushed with the dilute sulfuric acid electrolyte 175. Atop the final separator sheet, a monopolar top plate 135 and a second current collecting sheet 123 are layered to thereby establish electrical contact with the terminal 209 or 207 of opposite polarity. Of course, during the assembly of each battery cell stack 111, the bipolar plates 133 must be layered with a consistent orientation (i.e., negative active material 107 either facing up or down). Finally, once both battery cell stacks 111 have been formed end-to-end, the second, top thermal insulator 153 and bulkhead 157 are added to complete the two battery cell stacks 111.

The battery 101 is then ready for compression

B. Configuration Of Current-Collecting End Plates

As mentioned, each monopolar end plate 129 and 135 can simply be an additional biplate 109 that has been wrapped with a tube 177 of the woven lead yarn 103, in much the same manner as the manufacture of the bipolar plates 133. However, active materials 105 and 107 are placed upon only one side of the monopolar end plates 129 and 135 (one of them with positive active material 105 and the other with negative active material 107). During stacking, these monopolar end plates 129 and 135 are oriented with active material surfaces facing away from their respective current collectors 123 and 125. As seen in FIG. 2, these current collectors are conductive metal sheets which each have a laterally extending tab 147 that connects to the battery terminals 207 and 209.

The two adjacent battery cell stacks 111 are connected in parallel to provide for greater power output of the battery, and each set of terminals 207 and 209 are connected together, respectively, by means of cables 149, such that the negative terminals 207 are connected with each other and the positive terminals 209 are connected with each other.

C. Gas Manifolding

As mentioned earlier, if the battery 101 is subjected to improper conditions (such as improper charging) then oxygen and hydrogen gas will be produced within each cell of the cell stacks 111, and venting is required. Grooves 167 are, for this reason, placed in the sealing frames 145 of the separator sheets 131 for this purpose, which feed to the venting passages 169.

During the stack assembly process, the venting passages 169 of each separator sheet 131 or bipolar plate 133 are aligned to insure that excess pressure caused by gases in any of the cells are released into the venting passages 169. These passages extend through the thermal insulator 155 at the top end of the battery cell stack and to a pressure release valve 171 that is mounted to the bulkhead 157. This pressure relief valve 171 is configured to release gas pressures from the venting passages 169 when those pressures exceed a predetermined amount. Selection of a suitable pressure relief valve 171 and, in particular, an appropriate pressure release threshold for the valve 171 is within the ordinary level of the skill in the art, and depends upon the particular implementation and the pressures to be tolerated by the battery 101 under abnormal conditions.

D. Compression

Once the battery cell stacks 111 have been appropriately layered with eighty-five bipolar plates 133, monopolar top and bottom plates 129 and 135 and the current collecting end plates 123 and 125, the bulkhead 157 may be placed over the stacks 103 to cover them. The tie-rods 159 are then manually inserted through aligned apertures 211 in the battery tray and the bulkhead 151 and 157. These tie-rods 159 are essentially long bolts which are threaded at their end that passes through the bulkhead 157 and have a bolt head that retains them in contact with the battery tray 151. Tie-rod nuts 181 are then manually tightened to compress the bulkhead 157 downward to compress the sealing frames 141 and 145 against each other, their compliant materials interacting to form a gas-tight seal that retains the battery contents within the battery 101.

It should be readily apparent that numerous variations can be made without departing from the spirit of this invention. For example, different configurations can be substituted for the particular sealing construction set-forth above to perform an analogous purpose. Alternatively, the foregoing embodiment could be implemented in a form other than as a quasi-bipolar battery, such as another type of bipolar battery.

Having thus described an exemplary embodiment of the invention, it will be apparent that further alterations, modifications, and improvements will also occur to those skilled in the art. Such alterations, modifications, and improvements, though not expressly described or mentioned above, are nonetheless intended and implied to be within the spirit and scope of the invention. Accordingly, the foregoing discussion is intended to be illustrative only; the invention is limited and defined only by the following claims and equivalents thereto.

I claim:

1. A battery, comprising:
   two stack end plates;
   a battery cell stack between the two stack end plates, the battery cell stack having a repeating pattern of cell layers stacked along an axis and a terminal associated with each end of the battery cell stack, including
      a conductive separator sheet,
      a first active material,
      a biplate having first and second sides,
      a compliant sealing material on the first side of the biplate, and a compliant sealing material on the second side of the biplate, and
      a second active material;
   wherein each compliant sealing material forms a framed, middle region on the biplate, and each compliant sealing material also forms an engagement between the biplate and at least one of a separator sheet and a stack end plate, each compliant sealing material effective upon compression of the battery cell stack along the axis to form a gas-tight seal and retain gasses and active materials within boundaries associated with the engagement; and
   a compression mechanism that axially compresses the battery cell stack to thereby create the gas-tight seals and isolate each cell of the battery cell stack, and thereby retain the active materials of the battery cell stack in a gas-tight, sealed relationship within the battery cell stack.

2. A battery according to claim 1, wherein the battery cell stack includes at least one bipolar battery cell, at least one biplate being electrically conductive and ionically insulative.

3. A battery according to claim 1, wherein the battery cell smack includes at least one quasi-bipolar battery cell, at least one biplate being electrically and ionically insulative.

4. A battery according to claim 3, wherein:
   the battery cell stack is composed of a plurality of quasi-bipolar cells;
   the biplate of each layer is electronically and ionically insulative, and further, has edges defining a width and a length of the biplate; and
   the repeating pattern of cell layers includes an electrically-conductive material that is placed in contact with each of the first and second sides of the biplate and is folded about at least one of the edges of the substrate sheet, the first active material being placed in contact the electrically-conductive material on the first side of the biplate and the second active material being placed in contact with the electrically-conductive material on the second side of the biplate.

5. A battery according to claim 4, wherein the electrically-conductive material includes a woven sheet of conductive strands folded about at least one of the edges.

6. A battery according to claim 4, wherein the electrically-conductive material includes a plurality of concentric two-layered strands wrapped around at least one of the edges, the strands having a first, core layer composed of a silica material and a second, conductive layer composed of a conductive material.

7. A battery according to claim 1, wherein the layer of compliant sealing material includes injection-molded rubber shaped as a frame, and wherein the battery cell stack includes a plurality of such frames, such that each biplate and each separator sheet is sandwiched between two frames.

8. A battery according to claim 1, wherein the first active material is a lead dioxide material and the second active material is a lead material.

9. A battery according to claim 1, wherein:
   the battery cell stack includes a layer of thermal insulation at each axial end; and
   the sealing material conducts heat;
   whereby cooling of the battery cell stack occurs substantially in a lateral direction, perpendicular to the axis, and substantially does not occur in directions other than the lateral direction.

10. A battery according to claim 1, wherein the compression mechanism includes:
    at least two tie-rods extending generally parallel to the axis;
    aperture means in a receiving plate at each end of the battery cell stack, for receiving the at least two tie-rods at each end of the battery cell stack;
    a tightening device that is selectively actuated to compress the receiving plates at each end of the battery cell stack toward each other, thereby compressing the battery cell stack to create the gas-tight seals and isolate each cell of the battery cell stack, whereby the active materials of the battery cell stack and gasses are retained in a gas-tight, sealed relationship within the battery cell stack.

11. A battery according to claim 1, wherein the repeating pattern of cell layers also includes an electrolyte added to at least one of the first and second active materials.

12. A battery according to claim 1, further comprising a gas pressure relief discharge system having:
    a groove in each cell that permits the discharge of gas notwithstanding the gas-tight seal when pressure within the repeating pattern of layers exceeds a predetermined amount;
    a venting passage through each biplate layer and separator sheet; and
    a pressure relief valve permitting discharge of gas from the battery cell stack when pressure within the repeating pattern of layers exceeds a predetermined amount.

13. A battery according to claim 1, further comprising stack means for discharging gas from the battery cell stack.

* * * * *